United States Patent Office 2,933,372
Patented Apr. 19, 1960

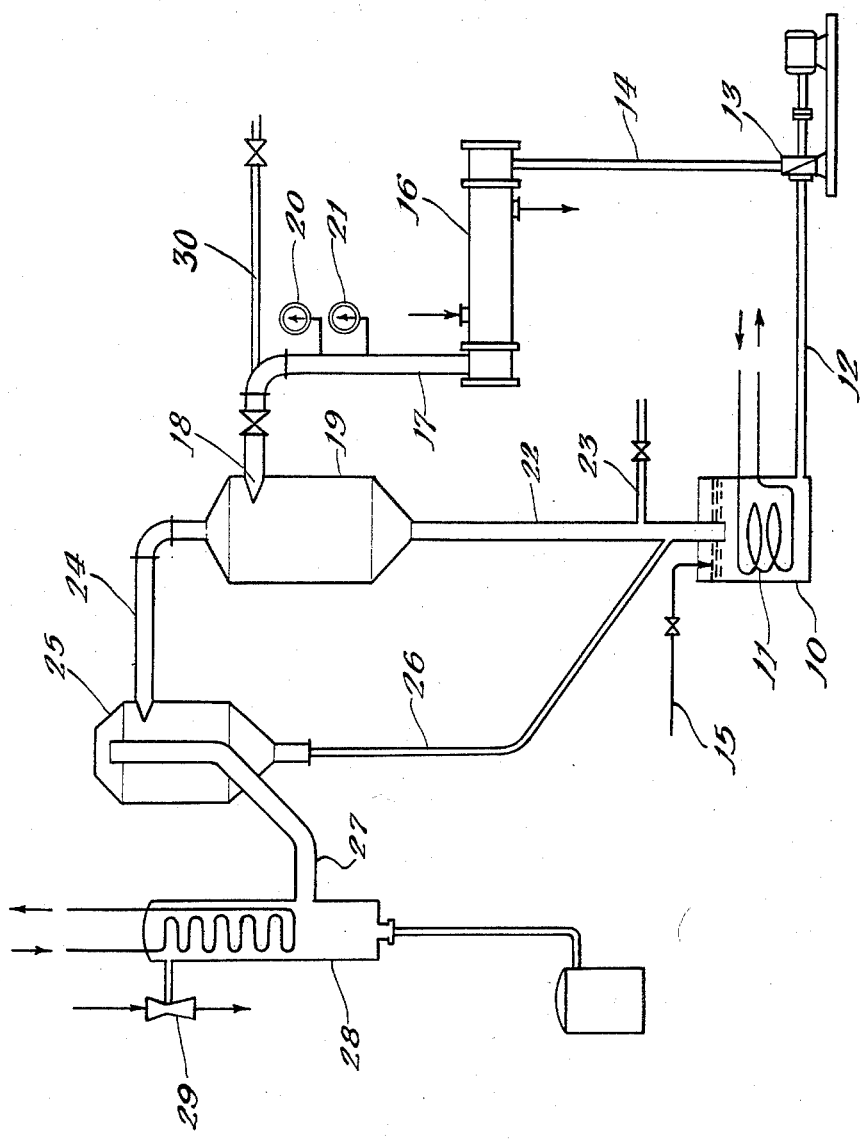

2,933,372

METHOD OF DEFLUORINATING PHOSPHATIC MATERIAL

Paul D. V. Manning, Glencoe, Ill., assignor to International Minerals & Chemical Corporation, a corporation of New York Application November 2, 1956, Serial No. 619,988

11 Claims. (Cl. 23—165)

This invention relates to the purification of solutions of phosphatic materials. More particularly, it relates to a method for eliminating fluorine from fluorine-containing solutions of phosphatic materials. Still more particularly, it relates to a method for elimination of fluorine from phosphoric acid solutions.

The economical commercial production from phosphate rock of phosphatic products of low fluorine content has challenged the art for many years. One commercially accepted method embraces generally the reaction of phosphate rock with reagents, such as mineral acids, under conditions and in concentrations which are effective to render at least a major portion of the phosphate values present in rock water soluble, extraction of the solubilized phosphate values with an aqueous medium and chemical or thermal defluorination of the resulting extract solution. Chemical defluorination of such extract solutions is conventionally accomplished by the addition of precipitants such as alkali metal or alkaline earth metal ions which are effective under controlled conditions to form a precipitate containing substantially all of the fluorine initially present therein. Frequently a substantial quantity of the phosphate values present in extract solutions so treated are lost to the fluorine-rich precipitate. Additionally, the careful control of the chemical defluorination reaction which is requisite to the production of suitably defluorinated extract solutions has proved commercially difficult to achieve.

Methods proposed by the prior art for the thermal defluorination of solutions for fluorine-containing phosphatic materials include the passage of superheated steam through a body of fluorine-containing phosphoric acid, the contact of the combustion gases with fluorine-containing phosphoric acid, and preheating the fluorine-containing phosphoric acid followed by spraying the preheated solution into a warm atmosphere. These methods of eliminating fluorine require inordinately large and commercially uneconomical amounts of heat and steam to reduce the fluorine content of solutions to a level permitting precipitation of animal feed grade products therefrom.

It is a primary object of the invention to provide a novel and economical method for eliminating fluorine from fluorine-containing phosphatic materials in aqueous solution.

It is a further object of the invention to provide a method for eliminating fluorine from wet process phosphoric acid which in some embodiments is effective to simultaneously concentrate such acid and yield a product of substantially reduced fluorine content and substantially increased concentration.

It is a further particular object of the invention to provide a method for reducing the fluorine content of wet process phosphoric acid which entails contacting the acid with steam and introducing the acid, while at an elevated temperature and pressure, into a zone of sub-atmospheric pressure.

It is a further object of the invention to provide a method for recovering fluorine compounds from fluorine-containing materials in aqueous solutions of acidulated phosphate rock extracts.

The method of the invention comprises heating the fluorine-containing phosphatic solution to an elevated temperature while maintaining a pressure suppressing vaporization of the aqueous solution, introducing the heated solution into a zone maintained at a pressure level lower than the vapor pressure of the hot solution in order to effect a sudden vaporization of water and fluorine-containing material, and recovering the unvaporized portion of said solution separately from the condensed vapors.

When solution is transferred from a heating zone where the system pressure is maintained higher than the vapor pressure of the hot aqueous solution to a vaporizing zone where the system pressure is maintained below the vapor pressure of the hot aqueous solution, a substantial portion of the water and fluorine-containing materials present in said solution flash, i.e., pass into the vapor state, leaving as a liquid product the solution of phosphatic materials of reduced fluorine content and of increased $P_2O_5$ concentration.

In general, for any particular set of initial or feed temperature and pressure conditions, the greater the differential in pressure created, the greater the amount of water and fluorine vaporized. The method requires careful control at two stages. Care must be taken to insure that during the first or heating operation, pressures are maintained such that there is no vaporization. Under these conditions, there is a minimum of fouling or scaling of the heating equipment. Secondly, concentration of the product should not be carried to the point where the product solidifies at temperatures prevailing in the low pressure zone.

This invention is particularly applicable to the defluorination of fluorine-containing phosphatic compositions contained in solution in aqueous extracts of acidulated phosphate rock. The particular manner or degree of acidulation, the acid employed, the curing time, if any, of the acidulated rock prior to extraction, and the particular manner of removal of water-insoluble materials such as calcium sulfate from the aqueous extracts so produced are all details of no significance to the method of the present invention which is applicable generically to eliminate fluorine from such extracts. Wet process phosphoric acid is a preferred starting material for defluorination, pursuant to the method of the invention. Aqueous extracts of phosphate rock which has been acidulated to a degree sufficient to convert all the phosphate values of the rock to phosphoric acid are contemplated. Extracts of cured and fresh superphosphate, which are primarily solutions of monocalcium phosphate and of low sulfate ion content, are typical. Reference is made to copending Le Baron application, Serial No. 312,519, now Patent No. 2,722,472, for a description of one method of producing such extracts. Other methods are well known to the art and are represented inter alia by Palazzo, Patent 1,851,210, and Moore, Patent 2,013,970. The invention is not restricted to the treatment of aqueous extracts of acidulated phosphate rock but is applicable generically to aqueous solutions of fluorine-containing phosphatic materials, regardless of origin.

In the practice of the invention, the aqueous solution of phosphatic material is raised to a temperature approaching if not exceeding the boiling temperature at atmospheric pressure, preferably about 105° C. to about 240° C., and a pressure maintained which is higher than atmospheric pressure, 5 pounds p.s.i. gauge being sufficient if the solution is at approximately its boiling temperature at atmospheric pressure and higher if the temperature appreciably exceeds the atmospheric pressure boiling temperature. Preferably, pressures of between about 5 and 100 pounds p.s.i. are utilized but pressure both above and below this range can be used so long as sufficient differential in pressure is obtainable to cause the solution to flash in the low pressure zone. Thereafter, the heated solution is introduced into a zone maintained at a pressure such that the solution temperature is above the boiling point of the solution under these latter pressure conditions. The heating temperature and initial pressure of this system will determine whether in order to create an effective pressure differential the zone of lower pressure may be at superatmospheric, i.e., under vacuum, in order to effect a flashing or expansion into vapor of the water and fluorine-containing materials present in the solution. The unvaporized portion of the solution constitutes a product material of reduced fluorine content which can, if desired, by recycled through the system or through equivalent apparatus in series. Normally, there is maintained in the flash chamber a vacuum of at least about five inches, preferably from about ten to about 29.9 inches of mercury. An optimum operating temperature range for the acid is from about 150° C. to about 200° C. at a pressure of from about ten to about 30 pounds p.s.i. gauge. In general, the degree of defluorination of the fluorine-containing phosphatic material in solutions treated by the method of the invention increases as the temperature thereof, prior to the flashing step, is raised, and as the pressure differential is increased.

Solutions of fluorine-containing phosphatic material, treated in accordance with the method of this invention, can be raised to an elevated temperature by the external application of heat, by the direct introduction of live steam or other hot vapor or gaseous material normally under pressure, or by other means known to the art. The introduction of live steam directly into the solution to be defluorinated has the beneficial effect of removing at least a portion of the fluorine prior to the flashing step. In general, steam at a temperature of at least about 150° C., preferably about 180° C., under a pressure of about 60 pounds p.s.i. gauge, preferably about 85 pounds p.s.i. gauge to about 120 pounds p.s.i. gauge, can be employed to raise the aqueous solution of fluorine-containing phosphatic material to the desired treating temperature.

The invention further contemplates the injection of steam into the solution of phosphatic material to be defluorinated by means of a conventional injector as it is discharged into the flash chamber, thus further taking advantage of the effectiveness of steam to defluorinate fluorine-containing phosphatic materials in aqueous solution. Any desired amount of steam can be so employed. In general, at least about one pound and preferably from about five to about ten pounds of steam is utilized per pound of phosphorus pentoxide in the solution discharged into the flash chamber. The steam is preferably utilized for such purposes under the temperature and pressure conditions above defined.

One appropriate apparatus which can be employed in the practice of the method of the invention is illustrated in the drawing. The arrangement illustrated includes a tank 10 for the feed solution of fluorine-containing phosphatic material. A preheating means, which in the figure takes the form of the steam coil 11, is provided to preheat the feed solution to a desired elevated temperature. A conduit 12 leads from the bottom of a tank 10 to the pump 13 which serves to pump feed solution from the tank 10 through conduit 14. A means 15 is provided for introducing additional solution into the tank 10. Conduit 14 delivers feed to the heat exchanger 16 and thence through the conduit 17 and the spray nozzle 18 and to the flash chamber 19. Heat exchanger 16 is heated by an appropriate means such as hot gases or steam. The conduit 17 is provided with an appropriate pressure gauge 20 and temperature gauge 21. Unvaporized product material, subsequent to the expansion or vaporization of water and fluorine-containing materials therefrom in the flash chamber 19, collects in the bottom thereof from which it can be alternately or simultaneously withdrawn through a barometric leg 22 as here illustrated or through a conduit and pump. Product is removed through valved product outlet 23. A conduit 24 leads from the flash chamber 19 to the entrainment separator 25 in which entrained liquid is separated from the vapor. The entrained material collects in the bottom of the entrainment separator 25 which is joined by means of a barometric leg 26 to the leg 22. The desired degree of vacuum is maintained in the system by means of a condenser 28 communicating with entrainment separator 25 through conduit 27. A vacuum pump or as here illustrated, a steam ejector 29, is connected to the condenser 28. Valved steam conduit 30 leads to a source of steam, not shown, by means of which steam under pressure can be injected into the solution to be defluorinated as it is discharged into the flash chamber, the steam injection being effected by a conventional type of injector. The arrangement is such that the solution undergoing treatment may be recycled through the system until a constant or desired fluorine content is obtained therein at which time solution may be withdrawn and a compensating additional quantity of feed material added. While the figure illustrates a single stage operation, it will be understood that the evolution of gases may be brought about in a series of flash chambers, for example, with the gases from each flash chamber being utilized as heating medium for liquor being recirculated in the system. The operation of the apparatus as shown in the drawing will be readily understood from the foregoing description thereof, and from the following examples which are illustrative of the best presently known mode for the practice of the invention.

*Example I*

Wet process phosphoric acid prepared in conventional manner containing about 34.8% by weight $P_2O_5$, about 0.42% by weight fluorine, and having elemental phosphorus to elemental fluorine weight ratio of about 36.5, is placed in the tank 10 and employed as the feed material. To initiate the process, the feed acid is pumped by pump 13 from tank 10 through the conduits 14 into and through the heat exchanger 16, the conduit 17, and the spray nozzle 18 into the flash chamber 19 where a portion of the water and fluorine-containing materials present therein are flashed into vapor.

The feed acid is preheated to a temperature of about 120° C. and raised to a temperature of about 175° C. and to a pressure of 25 pounds p.s.i. gauge in the course of passage through the constant displacement pump 23 and the heat exchanger 16. By means of the condenser 28 and steam jet ejector 29, there is maintained within the flash chamber a vacuum of about 11 inches of mercury.

The product produced by a single pass through a single stage flashing operation which is collected from the bottom of the flash chamber through the outlet 19 is characterized by a phosphorous pentoxide content of about 60.6% by weight, a fluorine content of about 0.25% by weight, and an elemental phosphorus to elemental fluorine weight ratio of about 106.

It should be apparent from the foregoing that in the process of the invention, the wet process phosphoric acid treatment is substantially concentrated and substantially reduced in fluorine content.

*Example II*

Example I is repeated with the exception that the wet process phosphoric acid feed material employed is heated to a temperature of about 182° C. prior to introduction into the flash chamber. The product so obtained is characterized by a phosphorous pentoxide content of about 62.79% by weight, a fluorine content of about 0.23% by weight, and an elemental phosphorus to elemental fluorine weight ratio of about 119.

Example III

Example I is repeated with the exception that steam at a temperature of about 150° C. is introduced through the conduit 30 and injected into the phosphoric acid to be defluorinated as it is sprayed through the spray nozzle 18 into the flash chamber. Results analogous to those described in Example I are obtained.

Example IV

Example I is practiced on a continuous basis pursuant to which phosphoric acid undergoing defluorination is processed in the system until a desired elemental phosphorus to elemental fluorine weight ratio of about 100 or higher is obtained, whereupon product liquid is continually withdrawn from the bottom of the flash chamber by means of conduits 22 and 23 and fresh feed phosphoric acid in a generally compensating amount is added to tank 10.

The invention as described and illustrated, provides an efficient thermal process for the defluorination of fluorine-containing phosphatic materials in solution. Product solutions of phosphatic materials of low fluorine content produced by the method of the invention, can be utilized in known manner in the production of calcium phosphate animal feed supplements, for example, by reaction with a calcium base such as calcium carbonate or limestone in the case of defluorinated wet process phosphoric acid, or in the production of other phosphate compositions and compounds in which a low fluorine content is desirable or essential.

The invention further finds particular utility as an adjunct to the calcium defluorination process more particularly described in copending Manning and Le Baron application, Serial No. 511,624. In accordance with such method, solutions of fluorine-containing phosphatic material are initially processed to adjust the elemental phosphorus to elemental fluorine weight ratio to a value of at least about 15 and are thereafter defluorinated by reaction with an appropriate amount of calcium ions in conventional manner.

The following example is illustrative of such an application of the process of this invention.

Example V

Example I is repeated with the exception that the wet process phosphoric acid to be defluorinated is heated to a temperature of about 136° C. prior to introduction into the flash chamber. The product produced is characterized by an elemental phosphorus to elemental fluorine weight ratio of about 72 and contains about 51% by weight of phosphorus pentoxide. The product acid so produced is then reacted with particulate calcium carbonate in an amount sufficient to form a precipitate containing substantially all the fluorine remaining in the acid and a minimum amount of phosphorus pentoxide values present. The defluorinated liquor obtained by removal of the fluorine-rich precipitate is useful in the production of an animal feed supplement by reaction with an additional amount of calcium ions to produce dicalcium phosphate.

Having thus fully described my invention, what I claim is:

1. A process for eliminating fluorine from an aqueous solution of fluorine-containing phosphatic materials which comprises introducing said aqueous solution of fluorine-containing phosphatic material, obtainable by acidulating phosphate rock, under sufficient superatmospheric temperature and superatmospheric pressure to suppress vaporization of said solution, into a low pressure zone of lower pressure than that maintained on the solution being introduced into said zone without introducing extraneous heat into said zone and with respect to which the temperature of said solution is substantially above its boiling point to cause at least a substantial portion of the water and fluorine-containing material present in said solution to flash into vapor in said zone, and collecting the unvaporized portion of said solution as a product solution of phosphatic material of reduced fluorine content.

2. The process of claim 1 wherein said solution is heated to a temperature of at least about 100° C. and is raised to a pressure of at least about 5 pounds p.s.i. gauge and wherein there is maintained, in said zone, a vacuum of at least about 5 inches of mercury.

3. The process of claim 1 wherein the solution is wet process phosphoric acid.

4. The process of claim 1 wherein steam is injected into said solution as said solution is introduced into said low pressure zone.

5. The process of claim 1 wherein said solution is sprayed into said low pressure zone.

6. The process of claim 1 wherein there is maintained, in said low pressure zone, a vacuum of from about ten to about thirty inches of mercury.

7. The process of claim 1 wherein said solution is raised to said superatmospheric temperature by the passage of steam under pressure therethrough prior to the introduction of said solution into said low pressure zone.

8. The process which comprises raising an aqueous solution of fluorine-containing phosphatic material obtainable by acidulating phosphate rock to a temperature of from about 150° C. to about 200° C., and a pressure of from about ten pounds p.s.i. gauge to about thirty pounds p.s.i. gauge, thereafter injecting steam into said solution as said solution is sprayed into a flash zone in which a vacuum of from about five to about thirty inches of mercury is maintained to cause at least a substantial portion of the water and fluorine-containing material present in said solution to expand and form vapor in said zone, and collecting the unvaporized portion of said solution as a product solution of phosphatic material of reduced fluorine content.

9. The process of claim 8 wherein at least about five pounds of steam is employed for each pound of phosphorous pentoxide sprayed into said zone.

10. The process of claim 8 wherein said solution is preheated by the passage of steam therethrough prior to introduction into said flash zone.

11. The process of claim 8 wherein said solution of fluorine-containing phosphatic material is wet process phosphoric acid.

References Cited in the file of this patent

UNITED STATES PATENTS

| | | |
|---|---|---|
| 1,597,984 | LaBour | Aug. 31, 1926 |
| 1,880,491 | Rothe | Oct. 4, 1932 |
| 1,972,196 | Larisson | Sept. 4, 1934 |
| 2,343,456 | Henninger | Mar. 7, 1944 |
| 2,759,795 | Archer | Aug. 21, 1956 |

UNITED STATES PATENT OFFICE
CERTIFICATE OF CORRECTION

April 19, 1960

Patent No. 2,933,372

Paul D. V. Manning

It is hereby certified that error appears in the printed specification of the above numbered patent requiring correction and that the said Letters Patent should read as corrected below.

Column 3, line 12, after "superatmospheric" and before the comma, insert -- or atmospheric pressure or must be at a subatmospheric --.

Signed and sealed this 27th day of September 1960.

(SEAL)

ttest:
KARL H. AXLINE
ttesting Officer

ROBERT C. WATSON
Commissioner of Patents